US005283125A

United States Patent [19]

Shinozaki et al.

[11] Patent Number: 5,283,125

[45] Date of Patent: Feb. 1, 1994

[54] DEW CONDENSATION PREVENTING STRUCTURE

[75] Inventors: Yukuo Shinozaki, Kashiwa; Mamoru Shinozaki, Funabashi, both of Japan

[73] Assignee: Takenaka Corporation, Osaka, Japan

[21] Appl. No.: 778,180

[22] PCT Filed: Apr. 24, 1991

[86] PCT No.: PCT/JP91/00551

§ 371 Date: Dec. 13, 1991

§ 102(e) Date: Dec. 13, 1991

[87] PCT Pub. No.: WO91/18154

PCT Pub. Date: Nov. 28, 1991

[30] Foreign Application Priority Data

May 24, 1990 [JP] Japan .................................. 2-135870
Oct. 8, 1990 [JP] Japan .................................. 2-271887

[51] Int. Cl.[5] .................................................. B32B 9/00
[52] U.S. Cl. .................................................. 428/411.1
[58] Field of Search ................. 428/411.1; 219/10.491

[56] References Cited

U.S. PATENT DOCUMENTS 5,073,689 12/1991 Tabata et al. .................. 219/10.491

*Primary Examiner*—Patrick J. Ryan
*Assistant Examiner*—Cathy K. Lee
*Attorney, Agent, or Firm*—Kalish & Gilster

[57] ABSTRACT

This invention relates to a space forming dew condensation preventing structure and a dew condensation preventing steel door disposed at the entrance to a room. This invention aims to provide a space forming dew condensation preventing structure which has the heat-insulating performance similar to that of an organic heat insulator and the same fire retardance as a conventional inorganic heat insulator, and by forming a heat-insulating layer having a moisture absorbing and releasing property, adjusts the humidity in the room to a comfortable state, and can surely prevent the occurrence of dew condensation. This invention uses a heat insulator prepared by mixing 3 to 50 parts by weight of synthetic resin emulsion in solid content equivalency, 1 to 20 parts by weight of organic microballoon, 0.3 to 5 parts by weight of carbon fiber and 10 to 200 parts by weight of inorganic microballoon with 100 parts by weight of cement.

5 Claims, 3 Drawing Sheets

PRIOR ART

DEW CONDENSATION PREVENTING STRUCTURE

BACKGROUND OF THE INVENTION

1. Field of the Invention

This invention relates to a dew condensation preventing structure, and more particularly to a dew condensation preventing structure forming a space and a dew condensation preventing steel door disposed at the entrance to a room.

2. Prior Art

In a room of a highly air-tight condominium or hotel for example, using a heater increases humidity and may result in giving a person an unpleasant feeling.

To provide a comfortable room for people, there have been developed wall, ceiling and other dew condensation preventing structures which prevent the occurrence of dew condensation by suitably adjusting moisture in a room.

FIG. 6 shows a dew condensation preventing structure for forming such a room, in which reference numeral 11 denotes a dew condensation preventing structure consisting of walls for forming a space 13.

This dew condensation preventing structure 11 consists of a concrete base 15. On the surface of this concrete base 15 on the space 13 side, a heat-insulating layer 17 is formed. And on the surface of the heat-insulating layer 17 on the space 13 side, a plaster board 19 having fire retardance is bonded by bonding agent 18.

The surface of this plaster board 19 on the space 13 side has a moisture absorbing and releasing layer 21 formed which absorbs moisture when the humidity in the space 13 is high and naturally releases moisture when the humidity is low. This moisture absorbing and releasing layer 21 is formed by having for example a wall paper bonded which can holds 200 to 300 g/m$^2$ of moisture. And, to give a moisture absorbing and releasing property to the wall paper of the moisture absorbing and releasing layer 21, it is formed in combination with material having a moisture absorbing and releasing property, such as a high water-absorbing polymer for example.

And the heat-insulating layer 17 is made of an organic heat insulator such as expanded urethane or Styrofoam (registered trademark).

In the above dew condensation preventing structure forming a space as described above, the heat-insulating layer 17 excludes the outside heat from entering and the moisture absorbing and releasing layer 21 adjusts the moisture in the space 13 to keep the humidity in the space 13 at a level that people feel comfortable and to suppress the occurrence of dew condensation.

But, the organic heat insulator such as expanded urethane and Styrofoam forming the heat-insulating layer 17 has such a low thermal conductivity of 0.02 to 0.03 (kcal/mhr° C.) that it has remarkable heat-insulating performance but has a disadvantage that it is easily flammable because it is organic.

In view of legal fire preventing regulations and strength, it is necessary to bond a flame retardant plaster board 19 to the surface of heat-insulating layer 17 on the space 13 side to form a base on which the moisture absorbing and releasing layer 21 consisting of a wall paper is applied. This results in disadvantages requiring many construction steps, much labor and making the space 13 narrow.

To solve the above disadvantages, the heat-insulating layer 17 is proposed to be made of an inorganic heat insulator such as expanded mortar or pearlite mortar.

The above inorganic heat insulator is not easily flammable. But it has a thermal conductivity of 0.2 to 0.3 (kcal/mhr° C.) which is exceptionally larger than that (0.02 to 0.03 kcal/mhr° C.) of an organic heat insulator. Thus, it has a disadvantage that its heat-insulating performance is inferior to that of the organic heat insulator.

Therefore, it is difficult to obtain a desired heat insulating performance. And to obtain the desired performance, a very thick material is required.

When the heat-insulating performance could be improved for the above inorganic heat insulator, its strength was adversely deteriorated. Therefore, it had a problem that it did not function as a base on which finishing was applied.

On the other hand, each apartment of an apartment house has a manufactured steel entrance door in view of fire preventing regulations.

These years, at the so-called "water-using area" near the entrance, a bathroom unit including a basin, a bathtub and a toilet is often disposed. Humidity at the corridor from the bathroom to the entrance or the space connecting the entrance and the bathroom is high. From autumn to winter, when the temperature falls, air with a high humidity touches to the surface of the steel front entrance door on the room side, and moisture in the air reached a dew point concentrates on the steel door surface. Very small waterdrops formed on the door grow larger and fall down to deeply wet the lower section of the door, outside floor, and the inside corridor.

To prevent the occurrence of dew condensation on the steel door, it is proposed to lower the humidity of the air in the corridor or connecting space, or to warm the steel door surface to over the dew point.

However, when anyone enters or leaves the bathroom, moisture-containing air flows into the corridor or connecting space, raising the humidity. Thus, it is very difficult to lower the humidity in the corridor or connecting space.

And, there is an idea of warming the steel door surface to above the dew point by employing a method used for heating an automobile window glass by arranging an electrical resistance to flow a current through it. But this is also very difficult because the steel door is not a nonconductor unlike the window glass.

SUMMARY OF THE INVENTION

This invention was completed to remedy the above problems. It aims to provide a dew condensation preventing structure which forms a space and can prevent the occurrence of dew condensation without fail by forming a heat-insulating layer having a moisture absorbing and releasing property to adjust a room humidity at a comfortable level. This structure has a heat-insulating performance similar to that of an organic heat insulator and also has the same fire retardance as a conventional inorganic heat insulator.

Another object of this invention is to provide a dew condensation preventing steel door which can surely prevent the occurrence of dew condensation.

The present dew condensation preventing structure forming a space has a heat-insulating layer formed on the surface of a space forming concrete base on the above space side. On the surface of the heat-insulating layer on the above space side, a moisture absorbing and releasing layer is formed, which absorbs moisture when the above space humidity is high and naturally releases moisture when the humidity is low. And the heat-insulating layer is formed by applying a heat insulator which is prepared by mixing 3 to 50 parts by weight of synthetic resin emulsion in solid content equivalency, 1 to 20 parts by weight of organic microballoon, 0.3 to 5 parts by weight of carbon fiber and 10 to 200 parts by weight of inorganic microballoon with 100 parts by weight of cement, onto the surface of the above concrete base on the space side by a wet process.

In the above-described dew condensation preventing structure forming a space, reasons for adding 10 to 200 parts by weight of inorganic microballoon to 100 parts by weight of cement are that adding less than 10 parts by weight increases amounts of other expensive materials increasing costs and not useful in enhancing fire resistant performance and adding more than 200 parts by weight results in a brittle product. In view of improved fire resistant performance, strength and costs, the inorganic microballoon is desirably added in 10 to 100 parts by weight.

Here, the wet process means to form a heat-insulating layer by adhering a viscous fluid heat insulator onto the surface of a concrete base by spraying or troweling.

In the above dew condensation preventing structure forming a space, since the moisture absorbing and releasing layer is formed in the space, moisture is absorbed when the humidity in the space is high and it is naturally released when the humidity is low, to automatically adjust the humidity in the space.

Because a seamless heat-insulating layer is formed by applying to a concrete base a heat insulator which is produced by mixing and kneading cement and inorganic microballoon with for example synthetic resin emulsion, carbon fiber, organic microballoon and if necessary a mixture in the form of paste prepared by mixing and kneading water-soluble resin, antifoamer and mildewproofing agent in advance, by the wet process, the heat conduction through the dew condensation preventing structure is effectively prevented and fire retardance is improved.

The heat-insulating layer has a small moisture permeation coefficient but an appropriate water absorption. When a room humidity increases, the heat-insulating layer absorbs moisture to collect therein, and when the room humidity lowers, the heat-insulating layer releases moisture, thereby assisting the humidity adjusting function of the moisture absorbing and releasing layer.

The dew condensation preventing structure forming a space can have a heat-insulating layer formed on the surface of a space-forming concrete base forming a space on the above space side and then has on the surface of the heat-insulating layer on the space side a moisture absorbing and releasing layer which absorbs moisture when the space humidity is high and naturally releases moisture when the humidity is low, and the above heat-insulating layer is formed by applying a heat insulator which is prepared by mixing 3 to 50 parts by weight of synthetic resin emulsion in solid content equivalency, 1 to 20 parts by weight of organic microballoon and 0.3 to 5 parts by weight of carbon fiber with 100 parts by weight of cement onto the surface of the concrete base on the space side by the wet process.

Reasons for adding 3 to 50 parts by weight of synthetic resin emulsion in solid content equivalency to 100 parts by weight of cement are that adding less than 3 parts by weight deteriorates a bond performance and adding more than 50 parts by weight deteriorates a fire resistant performance, adversely increasing costs.

Reasons for adding 1 to 20 parts by weight of organic microballoon to 100 parts by weight of cement are that adding less than 1 part by weight deteriorates a heat insulating performance and adding more than 20 parts by weight lowers a fire resistant performance and strength, adversely increasing costs.

And reasons for adding 0.3 to 5 parts by weight of carbon fiber to 100 parts by weight of cement are that adding less than 0.3 part by weight lowers a matrix reinforcing effect and an effect of preventing cracks due to contraction and adding more than 5 parts by weight induces poor workability, while increasing costs but not increasing a reinforcing effect so much.

In the latter dew condensation preventing structure forming a space, like the dew condensation preventing structure forming the space previously described, the humidity in the space is automatically adjusted by the moisture absorbing and releasing layer, and the humidity adjusting function of the moisture absorbing and releasing layer is supplemented by the heat-insulating layer. Further, thermal conduction through of the dew condensation preventing structure is effectively prevented by the inherent function of the heat-insulating layer.

A dew condensation preventing steel door is made by forming on the steel door body disposed at the entrance to a room a heat-insulating layer so that the layer is applied to the surface of the steel door on the space side, and the heat-insulating layer is formed of a heat insulator which is prepared by mixing cement, synthetic resin emulsion, microballoon and carbon fiber.

In the dew condensation preventing steel door just described, a heat insulator which is produced by mixing and kneading cement with for example synthetic resin emulsion, carbon fiber, microballoon and if necessary a paste mixture prepared by mixing and kneading water-soluble resin, thickening agent, antifoamer and mildewproofing agent in advance, is applied to a door body by the wet process to form a seamless heat-insulating layer. This produced door effectively prevents heat conduction between the outside and the interior, minimizing the temperature difference between the interior and the inner face of the steel door.

Even if the heat-insulating layer itself has a small moisture permeation coefficient, it has an appropriate water absorption. When a room humidity increases, the heat-insulating layer absorbs moisture and collects therein to balance against the room humidity.

Here, the wet process means to form a heat-insulating layer by adhering a viscous fluid heat insulator onto the surface of a door body by spraying or troweling.

Another dew condensation preventing steel door is formed by forming a heat-insulating layer on the surface of a steel door body on the room side which is disposed at the entrance to a room, and forming the heat-insulating layer with a heat insulator which is prepared by mixing 3 to 50 parts by weight of synthetic resin emulsion in solid content equivalency, 1 to 20 parts by weight of organic microballoon, 0.3 to 5 parts by weight of carbon fiber and 10 to 200 parts by weight of inorganic microballoon with 100 parts by weight of cement.

In the dew condensation preventing steel door just described, reasons for adding 10 to 200 parts by weight of inorganic microballoon to 100 parts by weight of cement are that adding less than 10 parts by weight increases amounts of other expensive materials increasing costs and is not useful in enhancing fire resistant performance and adding more than 200 parts by weight results in a brittle product. In view of improved fire resistant performance, strength and costs, the inorganic microballoon is desirably added in 10 to 100 parts by weight.

In the latter dew condensation preventing steel door, in the same way as the first-described dew condensation preventing steel door, the difference in temperature between the interior and the inner surface of the steel door is minimized.

Another dew condensation preventing steel door of claim 5 is formed by forming a heat-insulating layer on the surface of a steel door body on the room side which is disposed at the entrance to a room, and forming the heat-insulating layer with a heat insulator which is prepared by mixing 3 to 50 parts by weight of synthetic resin emulsion in solid content equivalency, 1 to 20 parts by weight of organic microballoon, and 0.3 to 5 parts by weight of carbon fiber with 100 parts by weight of cement.

In the second and third dew condensation preventing steel doors described, reasons for adding 3 to 50 parts by weight of synthetic resin emulsion in solid content equivalency to 100 parts by weight of cement are that adding less than 3 parts by weight deteriorates a bond performance and adding more than 50 parts by weight deteriorates a fire resistant performance, adversely increasing costs.

Reasons for adding 1 to 20 parts by weight of organic microballoon to 100 parts by weight of cement are that adding less than 1 part by weight deteriorates a heat insulating performance and adding more than 20 parts by weight lowers a fire resistant performance and strength, adversely increasing costs.

And, reasons for adding 0.3 to 5 parts by weight of carbon fiber to 100 parts of cement are that adding less than 0.3 part by weight lowers a matrix reinforcing effect and an effect of preventing cracks due to contraction and adding more than 5 parts by weight results in poor workability, while increasing costs and not increasing a reinforcing effect so much.

In the last-described dew condensation preventing steel door, in the same way as the first dew condensation preventing steel door, the difference in temperature between the room and the surface of the steel door on the room side is minimized.

DESCRIPTION OF THE PREFERRED EMBODIMENTS

The present invention will be described in detail with reference to the embodiments of the drawings.

Figure 1:
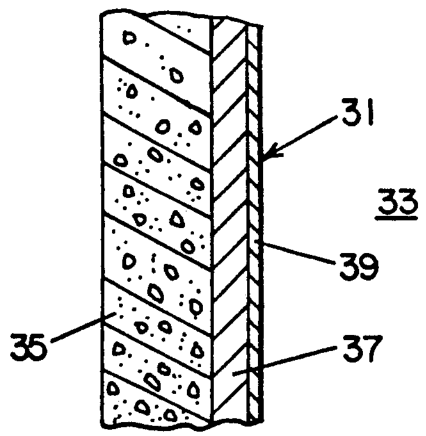
FIG. 1 is a vertical section showing one embodiment of the dew condensation preventing structure forming a space of this invention.
Figure 6:
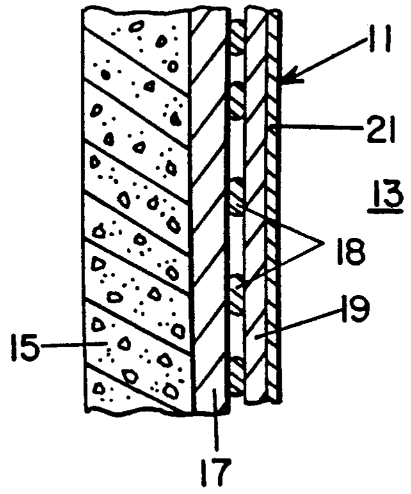
FIG. 6 is a vertical section showing a conventional dew condensation preventing structure forming a space.

FIG. 1 shows the first embodiment of the structure of this invention, in which reference numeral 31 shows a dew condensation preventing structure forming a space 33.

This dew condensation preventing structure 31 is formed of a concrete base 35. On the surface of this concrete base 35 on the space 33 side, a heat-insulating layer 37 is formed. And on the surface of the heat-insulating layer 37 on the space 33 side, a moisture absorbing and releasing layer 39 is formed, which absorbs moisture when the humidity in the space 33 is high and naturally releases moisture when the humidity is low.

This moisture absorbing and releasing layer 39 is formed by bonding for example a wall paper which can hold 200 to 300 g/m$^2$ of humidity, and to provide the wall paper with moisture absorbing and releasing property it is formed in combination with a material having the moisture absorbing and releasing property, such as a high water-absorbing polymer.

The heat-insulating layer 37 is formed by adhering a viscous fluidity heat insulator to the surface of the concrete base 35 on the space 33 side.

This heat insulator consists of cement, synthetic resin emulsion, carbon fiber, organic microballoon, water, water-soluble resin, thickening agent, antifoamer, mildew-proofing agent and inorganic microballoon.

The cement used is a high-early-strength Portland cement.

The synthetic resin emulsion is for example acrylic type, vinyl acetate type, synthetic rubber type, vinylidene chloride type, polyvinyl chloride type or a mixture thereof.

The carbon fiber have a fiber length of about 6 mm for example.

The organic microballoon has a particle diameter of 10 to 100 micrometers for example and a specific gravity of 0.04 or less. The inorganic microballoon has a particle diameter of 5 to 200 micrometers for example and a specific gravity of 0.3 to 0.7.

The thickening agent is a water-soluble polymer compound such as methyl cellulose, polyvinyl alcohol, and hydroxyethyl cellulose.

The above heat insulator is produced by mixing and kneading 100 parts by weight of powder with 28 parts by weight of synthetic resin emulsion (6.3 parts by weight in solid content equivalency), 2.6 parts by weight of carbon fiber, 24 parts by weight of organic microballoon, 0.4 part by weight of water-soluble resin, 137 parts by weight of water, and 100 parts by weight of a semi-liquid mixture consisting of a small amount of thickening agent, antifoamer and mildewproofing agent.

The powder consists of 100 parts by weight of a high-early-strength Portland cement and 16 parts by weight of inorganic microballoon.

The heat insulator thus produced has properties as shown in Table 1.

Specifically, it has a thermal conductivity of 0.06 (kcal/mhr° C.), a true specific gravity of 0.54, an air-dried specific gravity of 0.31, a bending strength of 12.8 (kgf/cm$^2$), a compressive strength of 14.7 (kgf/cm$^2$), a bond strength of 6.2 (kgf/cm$^2$), a moisture permeation coefficient of 0.315 ($g/m^2hmmHg$), and a water absorption of 31.4 (%).

The dew condensation preventing structure forming a space as structured above is made by applying a viscous fluidity heat insulator onto the surface of concrete base 35 on the space 33 side by spraying, troweling or gap-filling according to the wet process, thereby forming the heat-insulating layer 37 to a thickness of 10 to 15 mm for example, fully drying this heat-insulating layer 37, and adhering the moisture absorbing and releasing layer 39 made of the wall paper onto the concrete base 35.

The dew condensation preventing structure forming a space structured as above has the moisture absorbing and releasing layer 39 formed on the side facing the space 33, so that when the humidity in the space 33 is high, moisture is absorbed, and when the humidity is low, moisture is naturally released to effect automatic adjustment of the humidity in the space 33, keeping the space 33 in a comfortable condition for people.

The seamless heat-insulating layer 37 is formed by applying to the concrete base 35 a heat insulator which is prepared by mixing and kneading cement and inorganic microballoon with synthetic resin emulsion, carbon fiber, organic microballoon and if necessary a paste mixture prepared by mixing and kneading water-soluble resin, antifoamer, mildewproofing agent in advance, by the wet process. Thus, the thermal conduction through the dew condensation preventing structure can be effectively prevented, while improving fire retardance. The heat-insulating layer has the heat-insulating performance similar to that of an organic heat insulator. And its fire retardance is the same as a conventional inorganic heat insulator. Forming the heat insulator 37 having the moisture absorbing and releasing property can adjust the humidity in the space 33 at a comfortable level and surely prevent the occurrence of dew condensation.

The heat insulator of the heat-insulating layer 37 has thermal conductivity of 0.06 (kcal/mhr° C.) which is not so large as compared with that (0.02 to 0.03 kcal/mhr° C.) of an organic heat insulator. Therefore, this insulator has almost the same heat-insulating performance as the organic heat insulator. This is because the above heat insulator contains organic and inorganic microballoons, forming air pockets in the mortar. And because of the air pockets formed in the mortar, a true specific gravity is 0.54 and an air-dried specific gravity is 0.31, thus forming a very light heat insulator.

This heat insulator is an inorganic heat insulator containing a large amount of inorganic material, capable of extensively improving fire retardance as compared with the organic heat insulator.

The heat insulator uses cement in the form of matrix with which microballoon, synthetic resin emulsion and carbon fiber are combined, providing a strong internal bonding. Therefore, the heat insulator of this invention has a compressive strength of 14.7 $kgf/cm^2$ and a bending strength of 12.8 $kgf/cm^2$, while a conventional rigid urethane foam has a compressive strength of 1.4 to 2.0 $kgf/cm^2$ and polystyrene foam 2.5 to 3.0 $kgf/cm^2$ or expanded heat-insulating urethane foam has a bending and compressive strength of 3.0 to 5.0 $kgf/cm^2$. Thus the strength can be improved extensively.

And since the synthetic resin emulsion is contained, the heat insulator has a bond strength of 6.2 $kgf/cm^2$ against the concrete base 35, capable of enhancing the integrity of the heat insulator with the concrete base 35 and of surely preventing the heat insulator from peeling. Therefore, the heat insulator can be subject to the wet process and easily applied to the ceiling, buildings with many outside and reentrant angles in case of including beams, and cylindrical buildings. These execution of works were difficult to complete by conventional methods including the spraying of expanded urethane, boarding, and a dry process using heat-insulating boards.

Since the heat insulator's heat-insulating performance, fire retardance and strength can be improved, it is not necessary to form the moisture absorbing and releasing layer 39 based on a base which is obtained by applying a fire retardance material such as a plaster board onto the heat-insulating layer 37 in view of legal fire preventing regulations and strength. Using the heat-insulating layer 37 as a base, the moisture absorbing and releasing layer 39 can be directly formed thereon, reducing stages of execution of works extensively, securing a broad effective area (space) for accommodation, and extensively lowering labor and costs.

Since the heat-insulating performance of the heat-insulating layer 37 is improved, the difference in temperature between the dew condensation preventing structure 31 on the inner side and the room can be minimized, surely preventing the occurrence of dew condensation on the inner surface of dew condensation preventing structure 31.

The heat-insulating layer 37 has a low moisture permeation coefficient of 0.315 ($g/m^2hmmHg$) and a water absorption of 31.4(%) giving a suitable water absorbing performance. Regardless of a low moisture permeation coefficient, it has an appropriate water absorption, so that moisture exceeding the moisture amount absorbed by the moisture absorbing and releasing layer 39 is absorbed by the heat-insulating layer 37 and collected therein, and when the room humidity lowers, the heat-insulating layer 37 releases moisture to help the moisture adjusting function of the moisture absorbing and releasing layer 39. When the moisture occurred in the space 33 exceeds the amount that the moisture absorbing and releasing layer 39 can absorb, the heat-insulating layer 37 can absorb the moisture to securely prevent the occurrence of dew condensation.

The right column of Table 1 shows the properties of the heat insulator of the second embodiment of the dew condensation preventing space forming structure forming the space of this invention. The heat insulator of the heat-insulating layer 37 of this embodiment is prepared by mixing and kneading 62 parts by weight of synthetic resin emulsion (45% of solid content density) (27.9 parts by weight in solid content equivalency), 2.6 parts by weight of carbon fiber, 10.4 parts by weight of organic microballoon, 12.5 parts by weight of water, and 100 parts by weight of a semi-liquid mixture consisting of a small amount of thickening agent, antifoamer and mildewproofing agent, with 100 parts by weight of high-early-strength Portland cement.

The properties of the heat insulator include a thermal conductivity of 0.05 (kcal/mhr° C.), a true specific gravity of 0.52, an air-dried specific gravity of 0.30, a bending strength of 14.1 ($kgf/cm^2$), a compressive strength of 16.5 ($kgf/cm^2$), a bond strength of 6.8 ($kgf/cm^2$), a moisture permeation coefficient of 0.127 ($g/m^2hmmHg$), and a water absorption of 20.5(%).

The heat-insulating layer 37 formed of the above heat insulator is applied to the concrete base 35 to provide substantially the same effect as the above embodiment.

The heat-insulating layer 37 has a thermal conductivity of 0.05 (kcal/mhr° C.) which is not so large as compared with a thermal conductivity (0.02 to 0.03 kcal/mhr° C.) of an organic heat insulator. Therefore, the heat-insulating layer 37 can have substantially the same heat-insulating performance as the organic heat insulator.

The heat-insulating layer 37 has a moisture permeation coefficient of 0.127 (g/m$^2$hmmHg) and a water absorption of 20.5(%). Although its moisture permeation coefficient is low, the water absorption is appropriate. Therefore, the heat-insulating layer 37 absorbs the moisture exceeding the moisture amount absorbed by the moisture absorbing and releasing layer 39 and collects therein, and when the room humidity lowers, the heat-insulating layer 37 releases moisture to help the moisture adjusting function of the moisture absorbing and releasing layer 39. When the moisture occurred in the space 33 exceeds the amount that the moisture absorbing and releasing layer 39 can absorb, the heat-insulating layer 37 can absorb the moisture.

Therefore, the dew condensation preventing structure forming a space has a heat-insulating performance which is similar to that of an organic heat insulator and the same fire retardance as a conventional inorganic heat insulator, and by having the heat-insulating layer 37 having a moisture absorbing and releasing property formed thereon, it can adjust the humidity in the space 33 at a comfortable state, securely preventing the occurrence of dew condensation.

Resin-mingling thin-layered mortar in a thickness of about 1 to 2 mm may be placed between the heat-insulating layer 37 and the moisture absorbing and releasing layer 39. In this case, a facing with fine surface texture which requires a finer base, such as coating and cloth with fine texture, can be applied, and a wall surface strength can be further enhanced.

To 100 parts by weight of cement, the material such as synthetic resin emulsion, organic microballoon, carbon fiber, and inorganic microballoon can be added in variable amounts in the ranges of 3 to 50 parts by weight (in solid content equivalency), 1 to 20 parts by weight, 0.3 to 5 parts by weight and 10 to 200 parts by weight respectively, to provide substantially the same effect as the above embodiment. Varying the amount of each material can modify strength, specific gravity, heat-insulating performance, fire resistant performance and moisture absorbing and releasing property, capable of preparing a heat insulator provided with desired heat-insulating performance, fire resistant performance and moisture absorbing and releasing property.

In the above embodiment, a small amount of thickening agent, antifoamer and mildewproofing agent is mixed into the heat insulator, but this invention is not limited to the above embodiment. Without mixing the thickening agent, antifoamer, and mildewproofing agent, or with addition of other materials if necessary, the substantially same effect as above can be obtained.

TABLE 1

TABLE 1-continued

| Property | First embodiment | Second embodiment |
|---|---|---|
| Thermal conductivity (kcal/mhr °C. | 0.06 | 0.05 |
| Specific gravity | | |
| True specific gravity | 0.54 | 0.52 |
| Air-dried specific gravity | 0.31 | 0.30 |
| Strength | | |
| Bending strength (kgl/cm) | 12.8 | 14.1 |
| Compressive strength (kgl/cm) | 14.7 | 16.5 |
| Bond strength (Base) (kgl/cm) | Horter 6.2 | Horter 6.8 |
| Moisture permeation coefficient (g/hmmllg) | 0.315 | 0.127 |
| Water absorption coefficient (Volume %) | 31.4 (24h in water) | 20.5 (24h in water) |

Figure 2:
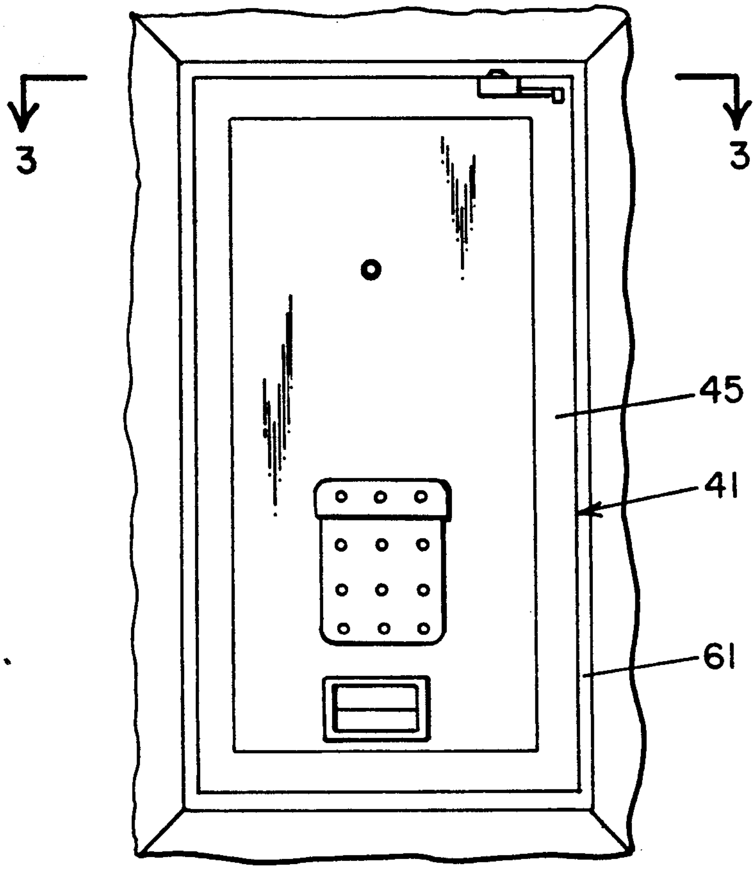
FIG. 2 is a front view showing one embodiment of the dew condensation preventing steel door of this invention.
Figure 3:
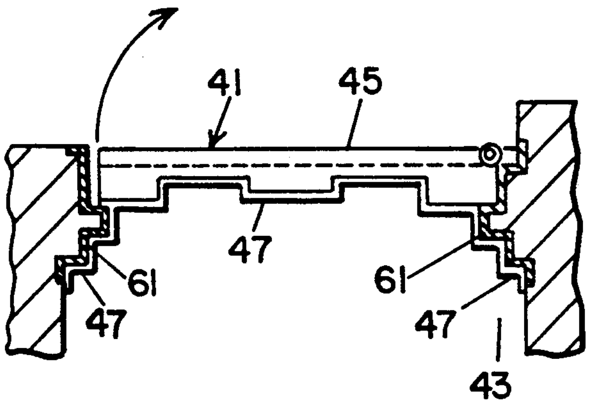
FIG. 3 is a transverse cross section taken along III—III of FIG. 2.

FIG. 2 and FIG. 3 show the first embodiment of the dew condensation preventing steel door of this invention, in which reference numeral 41 denotes a dew condensation preventing steel door which is disposed at the entrance to a room 43.

Figure 4:
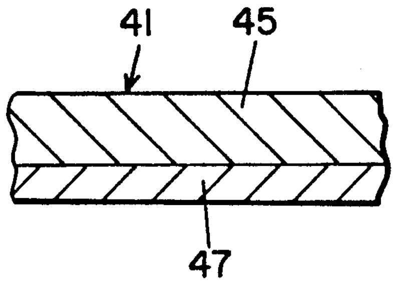
FIG. 4 is a transverse cross section of the dew condensation preventing steel door.

This dew condensation preventing steel door 41 is structured by forming a heat-insulating layer 47 on a door body 45 on the room 43 side as shown in FIG. 4. This heat-insulating layer 47 is formed by adhering a viscous fluidity heat insulator onto the face of the door body 45 on the room 43 side.

The heat insulator consists of cement, synthetic resin emulsion, carbon fiber, organic microballoon, water, water-soluble resin, thickening agent, antifoamer, mildew-proofing agent, and inorganic microballoon.

The cement used is a high-early-strength Portland cement.

The synthetic resin emulsion is for example acrylic type, vinyl acetate type, synthetic rubber type, vinylidene chloride type, polyvinyl chloride type or a mixture thereof.

The carbon fiber has a fiber length of about 6 mm for example.

The organic microballoon has a particle diameter of 10 to 100 micrometers for example and a specific gravity of 0.04 or less. The inorganic microballoon has a particle diameter of 5 to 200 micrometers for example and a specific gravity of 0.3 to 0.7.

The thickening agent is a water-soluble polymer compound such as methyl cellulose, polyvinyl alcohol, and hydroxyethyl cellulose.

The above heat insulator is prepared by mixing 100 parts by weight of powder with 28 parts by weight of synthetic resin emulsion (12.6 parts by weight in solid content equivalency), 2.6 parts by weight of carbon fiber, 8.0 parts by weight of organic microballoon, 0.8 part by weight of water-soluble resin, 160 parts by weight of water, and 100 parts by weight of a semi-liquid mixture consisting of a small amount of thickening agent, antifoamer and mildewproofing agent.

The powder consists of 100 parts by weight of a high-early-strength Portland cement and 16 parts by weight of inorganic microballoon.

This heat insulator thus produced has the properties as shown in Table 1.

Specifically, it has a thermal conductivity of 0.06 (kcal/mhr° C.), a true specific gravity of 0.54, an air-dried specific gravity of 0.31, a bending strength of 12.8 (kgf./cm$^2$), a compressive strength of 14.7 (kgf/cm$^2$), a bond strength of 6.2 (kgf/cm$^2$), a moisture permeation coefficient of 0.315 (g/m$^2$hmmHg), and a water absorption of 31.4(%).

The dew condensation preventing steel door 41 which has the heat-insulating layer 47 formed by applying the above heat insulator onto the door body 45 by the wet process is disposed at the entrance to the room 43. Temperatures were measured outside the room, on the surface of the steel door body 45 on the room 43 side, and on the surface of the heat-insulating layer 47 on the room 43 side. The results are shown in FIG. 5.

Figure 5:
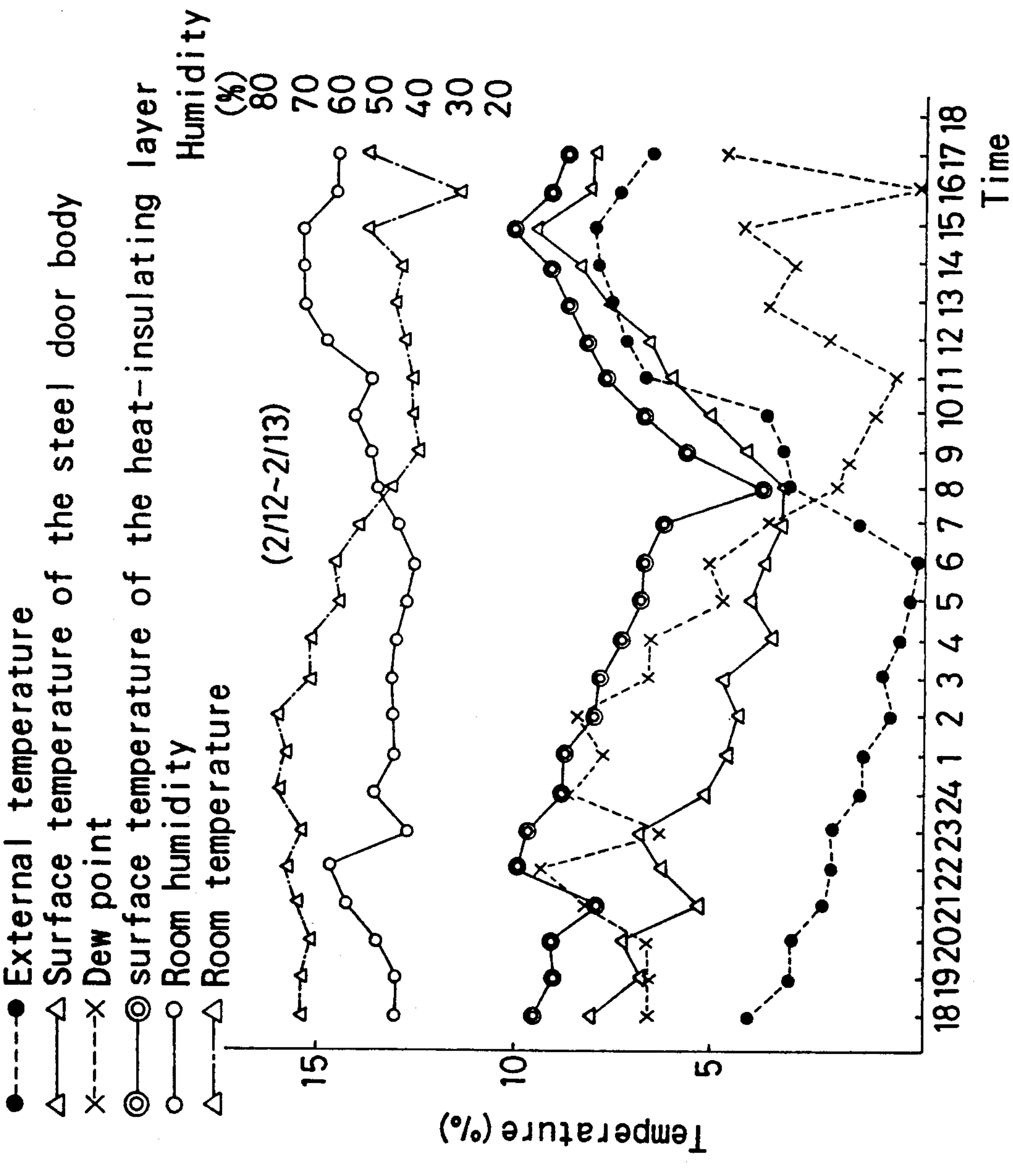
FIG. 5 is a line chart showing the results of test on the dew condensation preventing steel door of this invention.

In FIG. 5, ●---● stands for the external temperature, Δ—Δ for the surface temperature of the steel door body 35, x—x for the dew point, ⊚—⊚ for the surface temperature of the heat-insulating layer 37, ○—○ for the room humidity and Δ—Δ for the room temperature.

According to the test results, it is seen that the surface temperature of the heat-insulating layer 47 on the room 43 side is higher than that of the door body 45 and the dew point.

The door body 45 can prevent the temperature influence from outside to some extent. But the surface temperature of the door body 45 is often lower than the dew point. Therefore, when the surface of the door body 45 is exposed to the room 43, dew condensation is considered to take place.

In FIG. 2 and FIG. 3, reference numeral 61 shows a door frame, which is continuous from the outside to the inside of the door body 45. Therefore, the surface of the door frame 61 is also coated with the above heat insulator.

The dew condensation preventing steel door 41 formed as above has a viscous fluidity heat insulator applied to the surface of the door body 45 on the room 43 side by spraying, troweling or gap-filling according to the wet process, thereby forming the heat-insulating layer 47 to a thickness of 10 to 15 mm for example, and thoroughly drying the heat-insulating layer 47.

The dew condensation preventing steel door 41 constructed as above has a seamless heat-insulating layer 47 formed by applying to the door body 45 a heat insulator which is prepared by mixing and kneading cement and inorganic microballoon with synthetic resin emulsion, carbon fiber, organic microballoon and if necessary a paste mixture prepared by mixing and kneading in advance water-soluble resin, thickening agent, antifoamer and mildewproofing agent, by the wet process. This produced door effectively prevents heat conduction between the outside and the interior, minimizing the temperature difference between the surface of the steel door 41 on the room 43 side and the room 43 to surely prevent the occurrence of dew condensation.

The heat-insulating layer 47 is a heat insulator having similar heat-insulating performance as an organic heat insulator and the same fire retardance as a conventional inorganic heat insulator. And, since it is possible to form the heat-insulating layer 47 with higher strength and plainer surface as compared with a conventional one onto the door body 45, it can be used as it is. And the heat-insulating layer 47 has an appropriate moisture absorbing and releasing property regardless of its low moisture permeation coefficient. It can surely prevent the occurrence of dew condensation by the both effects of heat insulation and moisture absorbing and releasing properties.

The heat insulator of the heat-insulating layer 47 has a thermal conductivity of 0.06 (kcal/mhr° C.) which is not so high as compared with that (0.02 to 0.03 kcal/mhr° C.) of an organic heat insulator. Thus it can have substantially the same heat-insulating performance as the organic heat insulator. This is because the above heat insulator contains organic and inorganic microballoons, forming air pockets in the mortar. And because of the air pockets formed in the mortar, a true specific gravity is 0.54 and an air-dried specific gravity is 0.31, thus forming a very light heat insulator.

Since this heat insulator is an inorganic heat insulator containing a large amount of inorganic materials, its fire retardance can be largely improved as compared with an organic heat insulator.

And the heat insulator uses cement in the form of matrix, to which microballoon, synthetic resin emulsion, and carbon fiber are combined to enhance an internal bonding. The heat insulator of this invention has a compressive strength of 14.7 $kgf/cm^2$ and a bending strength of 12.8 $kgf/cm^2$, while a conventional rigid urethane foam has a compressive strength (1.4 to 2.0 $kgf/cm^2$), polystyrene foam has a compressive strength (2.5 to 3.0 $kgf/cm^2$) or an expanded heat-insulating mortar has a bending and compressive strength (3.0 to 5.0 $kgf/cm^2$). Thus the strength can be improved extensively.

Since the synthetic resin emulsion is contained, the bond strength to the door body 45 is enhanced and the integrity of the heat insulator with the door body 45 is accelerated, thereby surely preventing the heat insulator from peeling. Thus, the heat insulator can be easily subjected to the wet process.

As the heat-insulating performance of the heat-insulating layer 47 is improved, the temperature difference between the room 43 and the surface of the dew condensation preventing steel door 41 on the room 43 side can be minimized, surely preventing the occurrence of the dew condensation on the dew condensation preventing steel door 41.

The heat-insulating layer 47 has a small moisture permeation coefficient of 0.315 ($g/m^2hmmHg$) and an appropriate water absorption of 31.4(%), so that when the humidity in the room 43 increases, moisture is collected within the heat-insulating layer 47, and when the humidity in the room 43 lowers, moisture is released from the heat-insulating layer 47, thereby capable of preventing the occurrence of dew condensation without fail.

The right column of Table 1 shows the properties of the heat insulator of the second embodiment of the dew condensation preventing steel door 41 of this invention. The heat insulator of the heat-insulating layer 47 of this embodiment is prepared by mixing and kneading 100 parts by weight of a high-early-strength Portland cement with 62 parts by weight of synthetic resin emulsion (45% of solid content density) (27.9 parts by weight in solid content equivalency), 2.6 parts by weight of carbon fiber, 10.4 parts by weight of organic microballoon, 125 parts by weight of water, and 100 parts by weight of a semi-liquid mixture consisting of a small amount of thickening agent, antifoamer and mildew-proofing agent.

The properties of the heat insulator include a thermal conductivity of 0.05 (kcal/mhr° C.), a true specific gravity of 0.52, an air-dried specific gravity of 0.30, a bending strength of 14.1 ($kgf/cm^2$), a compressive strength of 16.5 ($kgf/cm^2$), a bond strength of 6.8 ($kgf/cm^2$), a moisture permeation coefficient of 0.127 ($g/m^2hmmHg$) and a water absorption of 20.5(%).

The heat-insulating layer 47 formed of the above heat insulator is formed on the door body 45 to provide substantially the same effect as the above embodiment.

Specifically, the heat-insulating layer 47 has a thermal conductivity of 0.05 (kcal/mhr° C.) which is not so large as compared with that (0.02 to 0.03 kcal/mhr° C.) of an organic heat insulator. Thus the heat-insulating layer has substantially the same heat-insulating performance as the organic heat insulator.

The heat-insulating layer 47 has a small moisture permeation coefficient of 0.127 ($g/m^2hmmHg$) and an appropriate water absorption of 20.5(%), so that when the humidity in the room 43 increases, moisture is absorbed by the heat-insulating layer 47 and collected within the heat-insulating layer 47, and when the humidity in the room lowers, moisture is released from the heat-insulating layer 47, thereby capable of exhibiting a temperature adjusting function to securely prevent the occurrence of dew condensation.

Therefore, with this dew condensation preventing steel door 41, the heat-insulating performance is similar to that of an organic heat insulator, and by using the heat insulator having the same fire retardance as a conventional inorganic heat insulator, the heat-insulating layer 47 with plainer surface and higher strength than before is formed on the door body 45. Thus, the occurrence of dew condensation can be surely prevented by the both effects of heat-insulating and moisture absorbing and releasing functions.

In the above embodiment, the heat insulator was applied to the door body 45 by the wet process to form the heat-insulating layer 47. But this invention is not limited to this embodiment. Almost the same effect as the above embodiment can be obtained by the dry process, specifically by forming a heat-insulating board from the heat insulator and applying the heat-insulating board to the door body.

To 100 parts by weight of cement, the material such as synthetic resin emulsion, organic microballoon, carbon fiber and inorganic microballoon can be added in variable amounts in the ranges of 3 to 50 parts by weight (in solid content equivalency), 1 to 20 parts by weight, 0.3 to 5 parts by weight and 10 to 200 parts by weight to provide substantially the same effect as the above embodiment. Varying the amount of each material can modify strength, specific gravity, heat-insulating performance, fire resistant performance and moisture absorbing and releasing property, capable of preparing a heat insulator provided with desired heat-insulating performance, fire resistant performance and moisture absorbing and releasing property.

In the above embodiment, a small amount of thickening agent, antifoamer and mildewproofing agent is mixed with the heat insulator. But this invention is not limited to this embodiment. Almost the same effect as the above embodiment can be obtained without adding the thickening agent, antifoamer and mildewproofing agent or with addition of other materials if necessary.

And, in the above embodiment, the cement, synthetic resin emulsion, organic microballoon, carbon fiber, and inorganic microballoon are limited their amounts used. But this invention is not limited to the above embodiment.

Also, in the above embodiment, the heat-insulating layer 47 is formed on the surface of the door body 45 on the room 43 side. But, this invention is not limited to the above embodiment. The heat-insulating layer may be formed on the outer face and the surface of the door body on the room side to provide almost the same effects as the above embodiment.

INDUSTRIAL APPLICABILITY

With the dew condensation preventing structure forming a space of claim 1, a heat-insulating layer is formed on the surface of a space forming concrete base on the space side, and on the surface of this heat-insulating layer on the space side, a moisture absorbing and releasing layer which absorbs moisture when the space humidity is high and naturally releases when the humidity is low is formed, and the heat-insulating layer is formed by applying a heat insulator which is prepared by mixing 3 to 50 parts by weight of synthetic resin emulsion in solid content equivalency, 1 to 20 parts by weight of organic microballoon, 0.3 to 5 parts by weight of carbon fiber, and 10 to 200 parts by weight of inorganic microballoon with 100 parts by weight of cement, onto the surface of the concrete base on the space side by the wet process. This heat-insulating layer has almost the same heat-insulating performance as an organic heat insulator, and in view of fire retardance, it has the same performance as a conventional inorganic heat insulator. Further, by forming the heat-insulating layer having a moisture absorbing and releasing property onto the concrete base, the room humidity can be adjusted to a comfortable state, surely preventing the occurrence of the dew condensation.

In the dew condensation preventing structure forming a space, on the surface of a space forming concrete base on the space side, a heat-insulating layer is formed. And on the surface of the heat-insulating layer on the space side, a moisture absorbing and releasing layer is formed which absorbs moisture when the humidity in the space is high and naturally releases moisture when the humidity is low. Since the heat-insulating layer is formed by applying a heat insulator which is prepared by mixing 3 to 50 parts by weight of synthetic resin emulsion in solid content equivalency, 1 to 20 parts by weight of organic microballoon, and 0.3 to 5 parts by weight of carbon fiber with 100 parts by weight of cement, on the concrete base on the space side by the wet process, the heat-insulating layer has almost the same heat insulating performance as that of an organic heat insulator and fire retardance which is the same as that of an inorganic heat insulator. And by forming the heat-insulating layer having the moisture absorbing and releasing property on the concrete base, the humidity in the space can be adjusted to a comfortable state, and the occurrence of dew condensation can be surely prevented.

With the dew condensation preventing steel door, on the surface of the steel door body on the room side which is disposed at the entrance to a room, a heat-insulating layer is formed. This heat-insulating layer is formed of a heat insulator which is prepared by mixing cement, synthetic resin emulsion, microballoon and carbon fiber. The heat insulator produced by mixing and kneading cement with for example synthetic resin emulsion, carbon fiber, microballoon and if necessary a paste mixture prepared by mixing and kneading water-soluble resin, thickening agent, antifoamer and mildewproofing agent is applied to the door body by the wet process for example to form a seamless heat-insulating layer. Thus thermal conduction between the outside and the interior is effectively prevented, the difference in temperature between the steel door room side and the room is minimized, and the occurrence of dew condensation can be surely prevented.

Even if the heat-insulating layer itself has a small moisture permeation coefficient, it has an appropriate moisture absorbing and releasing property. And, when the humidity in the room increases, the heat-insulating layer absorbs moisture and collects therein to surely prevent the dew condensation from occurring.

In the dew condensation preventing steel door, on a steel door body disposed at the entrance to a room, a heat-insulating layer is formed on the side facing the room. And the heat-insulating layer is formed of a heat insulator which is prepared by mixing 3 to 50 parts by weight of synthetic resin emulsion in solid content equivalency, 1 to 20 parts by weight of organic microballoon, 0.3 to 5 parts by weight of carbon fiber and 10 to 200 parts by weight of inorganic microballoon with 100 parts by weight of cement. In the same way as the dew condensation preventing steel door, the difference in temperature between the room side of the steel door and the room can be minimized and the occurrence of dew condensation can be surely prevented.

With the dew condensation preventing steel door, on a steel door body disposed at the entrance to a room, a heat-insulating layer is formed on the side facing the room. This heat-insulating layer is formed of a heat insulator prepared by mixing 3 to 50 parts by weight of synthetic resin emulsion in solid content equivalency, 1 to 20 parts by weight of organic microballoon, and 0.3 to 5 parts by weight of carbon fiber with 100 parts by weight of cement. In the same way as the dew condensation preventing steel door, the difference in temperature between the room side of the steel door and the room can be minimized and the occurrence of dew condensation can be surely prevented.

What is claimed is:

1. A dew condensation preventing space forming structure characterized by a heat-insulating layer formed on a space-forming concrete base on the space side of the concrete base, a moisture absorbing and releasing layer which absorbs moisture when the humidity in the space is uncomfortably high and naturally releases moisture when the humidity decreases to a point at which dew condensation would normally form on the space side of the heat-insulating layer, and the heat-insulating layer being formed by applying a heat insulator prepared by mixing 3 to 50 parts by weight of synthetic resin emulsion in solid content equivalency, 1 to 20 parts by weight of organic microballoon, 0.3 to 5 parts by weight of carbon fiber and 10 to 200 parts by weight of inorganic microballoon with 100 parts by weight of cement on said space side of the concrete base by a wet process.

2. A dew condensation preventing space forming structure characterized by a heat-insulating layer formed on a space forming concrete base on the space side of the concrete base, a moisture absorbing and releasing layer which absorbs moisture when the humidity in the space is uncomfortably high and naturally releases moisture when the humidity decreases to a point at which dew condensation would normally form on the space side of the heat-insulating layer, and the heat-insulating layer being formed by applying a heat insulator prepared by mixing 3 to 50 parts by weight of synthetic resin emulsion in solid content equivalency, 1 to 20 parts by weight of organic microballoon and 0.3 to 5 parts by weight of carbon fiber with 100 parts by weight of cement on said space side of the concrete base by a wet process.

3. A dew condensation preventing steel door characterized by a heat-insulating layer formed on the side of a steel door body facing a room, the steel door body being disposed at the entrance to the room, and said heat-insulating layer being formed of a heat insulator prepared by mixing cement, synthetic resin emulsion, microballoon and carbon fiber.

4. A dew condensation preventing steel door characterized by a heat-insulating layer formed on the side of a steel door body facing a room, the steel door body being disposed at the entrance to the room, and said heat-insulating layer being formed of a heat insulator prepared by mixing 3 to 50 parts by weight of synthetic resin emulsion in solid content equivalency, 1 to 20 parts by weight of organic microballoon, 0.3 to 5 parts by weight of carbon fiber and 10 to 200 parts by weight of inorganic microballoon.

5. A dew condensation preventing steel door characterized by a heat-insulating layer formed on the side of a steel door body facing a room, the steel door body being disposed at the entrance to the room, said heat-insulating layer being formed of a heat insulator prepared by mixing 3 to 50 parts by weight of synthetic resin emulsion in solid content equivalency, 1 to 20 parts by weight of organic microballoon and 0.3 to 5 parts by weight of carbon fiber with 100 parts by weight of cement.

* * * * *